(12) United States Patent
Challa et al.

(10) Patent No.: US 7,020,180 B2
(45) Date of Patent: Mar. 28, 2006

(54) METHOD AND APPARATUS FOR ACQUIRING PILOTS OVER CODE SPACE AND FREQUENCY ERRORS IN A CDMA COMMUNICATION SYSTEM

(75) Inventors: Raghu Challa, San Diego, CA (US); Gilbert Christopher Sih, San Diego, CA (US); Serguei A. Glazko, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 444 days.

(21) Appl. No.: 09/971,903

(22) Filed: Oct. 4, 2001

(65) Prior Publication Data

US 2003/0067898 A1 Apr. 10, 2003

(51) Int. Cl.
*H04B 1/69* (2006.01)

(52) U.S. Cl. .................................................. 375/147

(58) Field of Classification Search ......... 375/130–147, 375/150, 347, 349; 370/320, 335, 342, 441; 455/520, 513, 132, 526, 525, 506
See application file for complete search history.

(56) References Cited

U.S. PATENT DOCUMENTS

| | | | |
|---|---|---|---|
| 4,701,934 A | 10/1987 | Jasper | |
| 5,764,687 A * | 6/1998 | Easton | 375/147 |
| 5,781,543 A * | 7/1998 | Ault et al. | 370/342 |
| 5,790,589 A * | 8/1998 | Hutchison et al. | 375/149 |
| 5,926,503 A * | 7/1999 | Kelton et al. | 375/148 |
| 5,966,402 A * | 10/1999 | Yamamoto | 375/150 |
| 5,995,483 A * | 11/1999 | Marchok et al. | 370/207 |
| 6,111,911 A * | 8/2000 | Sanderford et al. | 375/147 |
| 6,178,193 B1 * | 1/2001 | Kondo | 375/130 |
| 6,269,075 B1 * | 7/2001 | Tran | 370/206 |
| 6,272,167 B1 * | 8/2001 | Ono | 375/144 |
| 6,298,083 B1 | 10/2001 | Westcott et al. | |
| 6,424,816 B1 * | 7/2002 | Stephens | 455/2.01 |
| 6,452,961 B1 * | 9/2002 | Van Wechel | 375/142 |
| 6,507,743 B1 * | 1/2003 | Abrishamkar et al. | 455/458 |
| 6,519,277 B1 * | 2/2003 | Eidson | 375/150 |
| 6,522,871 B1 * | 2/2003 | Patrick et al. | 455/256 |
| 6,567,462 B1 * | 5/2003 | Brunner et al. | 375/148 |
| 6,621,855 B1 * | 9/2003 | Van Stralen et al. | 375/142 |
| 6,628,735 B1 * | 9/2003 | Belotserkovsky et al. | 375/355 |
| 6,690,680 B1 * | 2/2004 | Marchok et al. | 370/480 |
| 6,700,866 B1 * | 3/2004 | Heinonen et al. | 370/208 |
| 6,700,922 B1 * | 3/2004 | Challa et al. | 375/147 |
| 6,728,203 B1 * | 4/2004 | Wang | 370/210 |
| 2002/0009064 A1 * | 1/2002 | Blessent et al. | 370/335 |
| 2002/0024992 A1 * | 2/2002 | Ogawa et al. | 375/148 |
| 2002/0136274 A1 * | 9/2002 | Proctor et al. | 375/142 |

FOREIGN PATENT DOCUMENTS

| | | |
|---|---|---|
| EP | 0654913 | 11/1994 |
| EP | 0810741 | 5/1997 |
| WO | 0163813 | 8/2001 |

* cited by examiner

*Primary Examiner*—Emmanuel Bayard
(74) *Attorney, Agent, or Firm*—Philip R. Wadsworth; Charles D. Brown; Timothy F. Loomis

(57) ABSTRACT

Techniques to acquire pilots over code space and/or frequency errors. In one aspect, pilot acquisition is performed using a number of substages, and some of the substages are pipelined and performed in parallel using different processing elements. A searcher initially searches over a designated code space to find peaks, and these peaks may be re-evaluated. Finger processors then attempt to acquire the candidate peaks. The searcher may be operated to search for the next set of peaks while the finger processors process the current set of peaks. In another aspect, the full range of frequency errors for the pilots is divided into a number of frequency bins. A multi-stage scheme is used to evaluate the bins, and may employ pipelining and parallel processing such that a search for peaks in the next bin is performed while acquisition of peaks found for the current bin is attempted.

19 Claims, 8 Drawing Sheets

METHOD AND APPARATUS FOR ACQUIRING PILOTS OVER CODE SPACE AND FREQUENCY ERRORS IN A CDMA COMMUNICATION SYSTEM

BACKGROUND

1. Field

The present invention relates to data communication, and more particularly to techniques for acquiring signals (e.g., pilots) over code space and/or frequency errors in a CDMA communication system.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques. CDMA systems may provide certain advantages over other types of system such as increased system capacity. A CDMA system is typically designed to conform to one or more standards, such as IS-95, cdma2000, IS-856, W-CDMA, and TS-CDMA standards, all of which are known in the art and incorporated herein by reference.

A terminal in a CDMA system needs to acquire signals transmitted from one or more base stations in order to receive or exchange data. In many CDMA systems, a pilot is transmitted from each base station to assist the terminals perform a number of functions. The pilot is typically generated based on a known data pattern (e.g., a sequence of all zeros) and using a known signal processing scheme (e.g., covered with a Walsh code of zero and spread with a known pseudo-random noise (PN) sequence). For IS-95 and cdma2000 systems, each base station is assigned a specific PN offset that is different from those of neighboring base stations to allow the terminals to distinguish the individual base stations. The pilots from the base stations may be used at the terminals for acquisition, frequency and timing synchronization, channel estimation, coherent demodulation of a data transmission, and so on.

The acquisition of a pilot is made challenging due to various phenomena. First, the pilot is distorted by noise and interference in the communication link, which can make detection of the pilot difficult at a terminal. Second, due to obstructions and artifacts in the transmission environment, a transmitted pilot typically reaches the terminal via a number of signal paths, and the received signal at the terminal normally includes multiple instances of the pilot at various amplitudes, phases, and delays. Third, since the terminal may not be aware of its location and/or timing relative to system time, a large PN code space may need to be searched to find the pilot. And fourth, movement by the terminal creates a Doppler shift in the frequency of the received pilot, causing the pilot's frequency to be offset from a nominal (expected) value.

There is therefore a need in the art for techniques to effectively acquire signals (e.g., pilots) over code space and/or frequency errors.

SUMMARY

Aspects of the invention provide techniques to effectively acquire pilots over code space and/or frequency errors. These techniques may be used to provide improved probability of detection and/or shorter acquisition time.

In one aspect, pilot acquisition is performed using a number of substages, and some of the substages are pipelined and performed in parallel using different processing elements to shorten the acquisition time. In one specific implementation, an initial search over a designated code space (e.g., the entire PN code space) is performed by a searcher to find peaks representative of possible multipaths in a received signal (detect substage), and these peaks may be re-evaluated to remove noise peaks (dwell substage) and provide candidate peaks. Finger processors may then be assigned to the candidate peaks and attempt to acquire these peaks over frequency errors (pull-in substage). The searcher may be operated to search for the next set of peaks while the finger processors are processing the current set of peaks. The detect, dwell, and pull-in substages form a basic stage that may be used to form numerous pilot acquisition schemes.

Various pilot acquisitions schemes may be designed to search for and acquire pilots using multiple stages. Each stage of a multi-stage scheme may be designed to tradeoff between various factors such as probability of detection, speed of searching, maximum frequency error that may be acquired, and so on. A different set of parameter values may be used for each stage to improve the likelihood of pilot acquisition for different operating conditions. Each stage may be implemented using a number of substages, and the substages and stages may be pipelined and performed in parallel to shorten acquisition time.

In another aspect, the full range of possible frequency errors for the pilots is divided into a number of frequency bins. A multi-stage acquisition scheme is then used to evaluate the frequency bins, and one or more stages may be used for each bin. The multi-stage scheme may incorporate the pipelining and parallel processing such that the searcher may perform a search for the next set of peaks in the next frequency bin while the finger processors attempt acquisition of the current set of peaks found for the current frequency bin.

The acquisition techniques described herein may be used for the forward link, and possibly the reverse link, in various CDMA systems such as IS-95, cdma2000, W-CDMA, and TS-CDMA. The invention further provides other methods, demodulators, receiver units, terminals, and other elements and devices that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
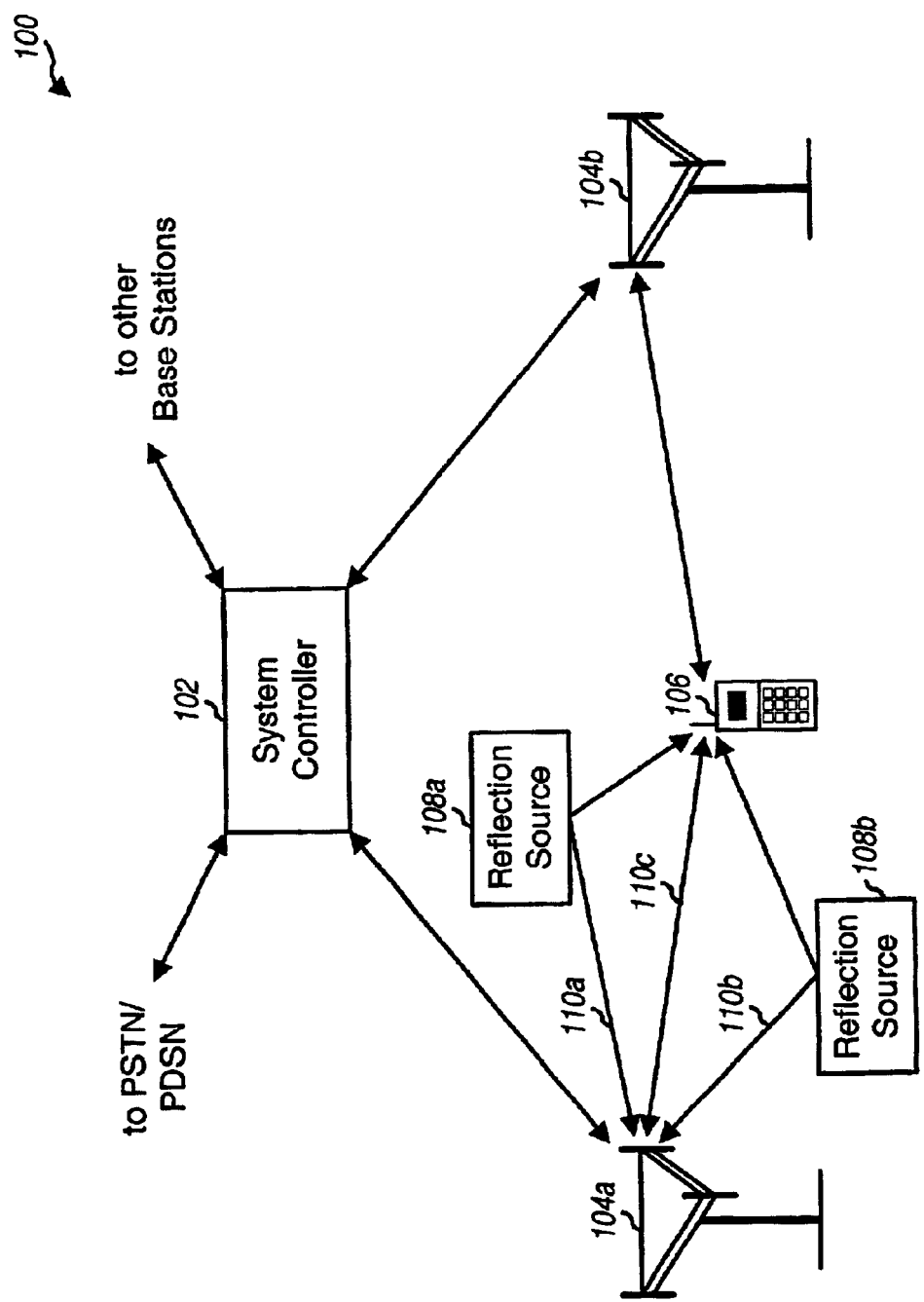
FIG. 1 is a diagram of a wireless communication system.

FIG. 1 is a diagram of a wireless communication system 100 wherein various aspects and embodiments of the invention may be implemented. System 100 provides communication for a number of cells, with each cell being serviced by a corresponding base station 104. A base station is also commonly referred to as a base-station transceiver system (BTS), an access point, or a Node B. Various terminals 106 are dispersed throughout the system (only one terminal is shown in FIG. 1 for simplicity).

Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

A signal transmitted from a base station may reach the terminal via one or multiple signal paths. These signal paths may include a straight path (such as signal path 110c) and/or reflected paths (such as signal paths 110a and 110b). Reflected paths 110a and 110b are created when the transmitted signal is reflected off reflection sources 108a and 108b, respectively, and arrives at the terminal via different paths than the line-of-sight path. Reflection sources 108 are typically artifacts in the environment in which the terminal is operating (e.g., buildings, trees, or some other structures). The received signal at the terminal may thus comprise a number of signal instances (or multipaths) from one or more base stations. The reverse link is also similarly affected by this multipath phenomenon.

In system 100, a system controller 102 (which is also often referred to as a base station controller (BSC)) couples to base stations 104 and may further couple to a packet data network via a packet data serving node (PDSN) and/or a public switched telephone network (PSTN) via a mobile switching center (MSC), all of which are not shown in FIG. 1. System controller 102 provides coordination and control for the base stations coupled to it, and further controls the routing of calls to terminals 106 via the coupled base stations.

System 100 may be designated to support one or more CDMA standards such as IS-95, IS-856, cdma2000, W-CDMA, TS-CDMA, and others. These CDMA standards are known in the art and incorporated herein by reference.

The pilot acquisition techniques of the invention may be implemented on the forward link, and possibly the reverse link, in various CDMA systems. For clarity, these techniques are specifically described for the forward link in IS-95 and cdma2000 systems.

Figure 2:
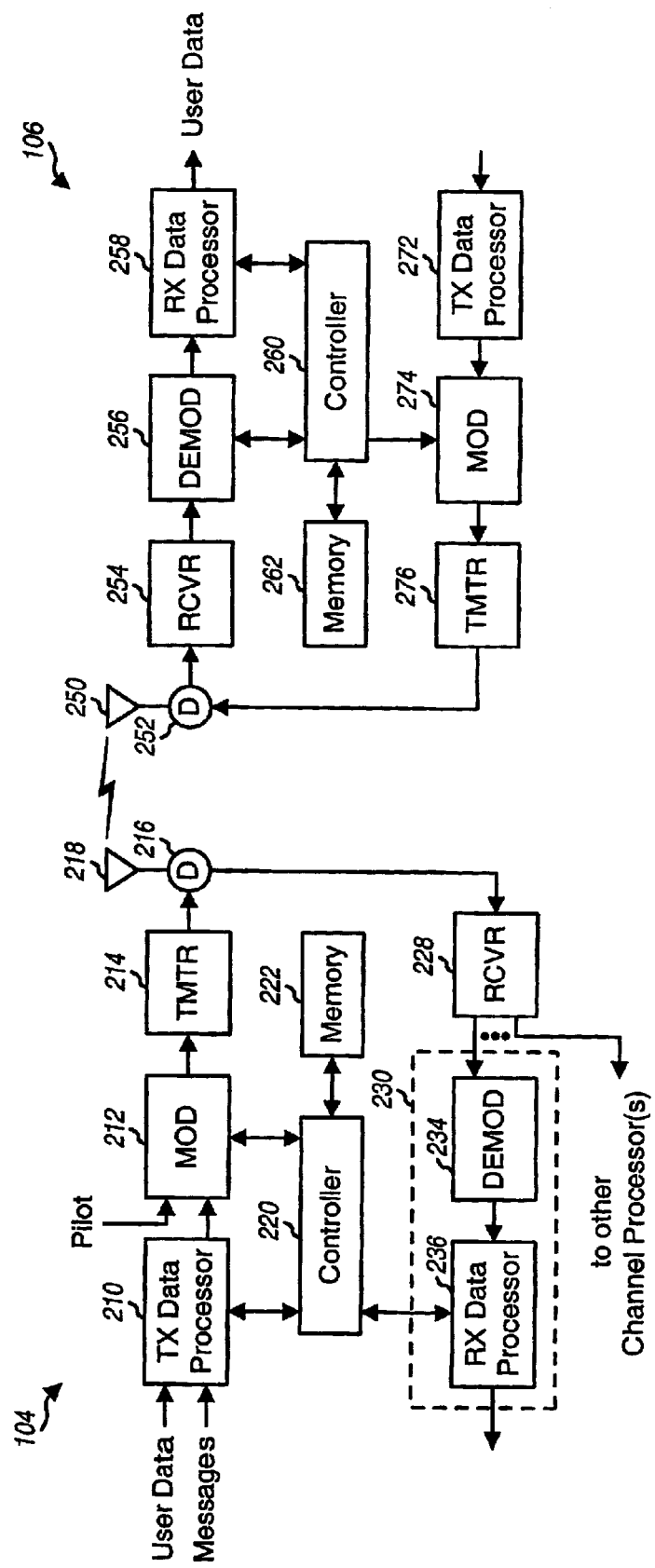
FIG. 2 is a simplified block diagram of an embodiment of a base station and a terminal.

FIG. 2 is a simplified block diagram of an embodiment of base station 104 and terminal 106. On the forward link, at base station 104, a transmit (TX) data processor 210 receives various types of "traffic" such as user-specific data, messages, and so on. TX data processor 210 then formats and codes the different types of traffic based on one or more coding schemes to provide coded data. Each coding scheme may include any combination of cyclic redundancy check (CRC), convolutional, Turbo, block, and other coding, or no coding at all. Interleaving is commonly applied when error-correcting codes are used. Typically, different types of traffic are coded using different coding schemes.

A modulator (MOD) 212 receives pilot data and the coded data from TX data processor 210, and further processes the received data to generate modulated data. For IS-95 and cdma2000, the processing by modulator 212 includes (1) channelizing (i.e., covering) the data for each of a number of code channels (e.g., traffic, sync, paging, and pilot channels) with a respective Walsh code to channelize the user-specific data, messages, and pilot data onto their respective code channels, (2) summing the channelized data for all code channels, and (3) spreading the summed data with a complex pseudo-random noise (PN) sequence at a particular PN offset assigned to the base station. The pilot is typically channelized with a Walsh code of zero.

The modulated data is then provided to a transmitter unit (TMTR) 214 and conditioned (e.g., converted to one or more analog signals, amplified, filtered, and quadrature modulated) to generate one or more forward modulated signals, which are routed through a duplexer 216 and transmitted from one or more antennas 218 over a wireless link to the terminals.

At terminal 106, the forward modulated signals from one or more base stations are received by an antenna 250, routed through a duplexer 252, and provided to a receiver (RCVR) 254. Receiver 254 conditions (e.g., filters, amplifies, downconverts, and digitizes) the received signal and provides data samples. A demodulator (DEMOD) 256 then receives and processes the data samples to provide recovered symbols. For IS-95 and cdma2000, the processing by demodulator 256 includes (1) despreading the data samples with the (complex-conjugate) PN sequence used to spread the data at the base station, (2) decovering the despread samples with the proper Walsh codes to channelize the received data and pilot onto their respective code channels, and (3) coherently demodulating the channelized data with pilot estimates recovered from the received signal. Demodulator 256 may implement a rake receiver that can process multiple signal instances (or multipaths) in the received signal, as described below.

A receive (RX) data processor 258 then receives and decodes the symbols from demodulator 256 to recover the user-specific data and messages transmitted on the forward link. The processing by demodulator 256 and RX data processor 258 is complementary to that performed by modulator 212 and TX data processor 210, respectively, at base station 104.

The reverse link processing is also shown in FIG. 2 but not described herein. The reverse link processing is also dependent on the particular CDMA standard being implemented.

Controllers 220 and 260 may be used to direct various operations at the base station and terminal, respectively. Memory units 222 and 262 may be used to store data and codes for controllers 220 and 260, respectively.

Figure 3:
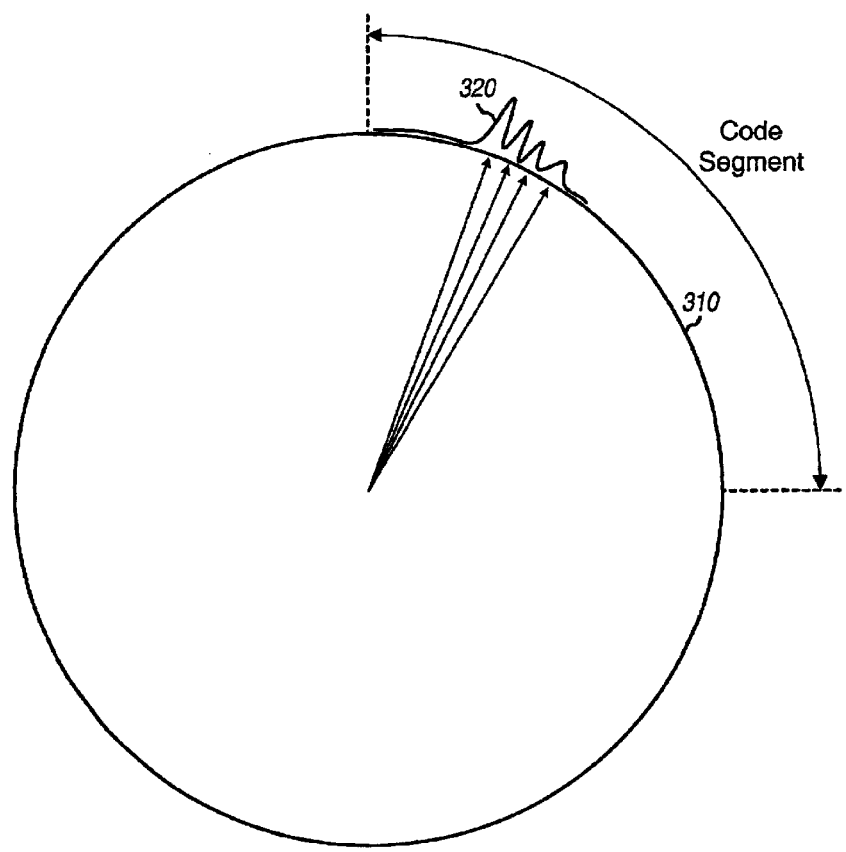
FIG. 3 is a diagram of a circle that represents the entire code space for the PN sequence.

FIG. 3 is a diagram of a circle that represents the entire code space for the PN sequence used to spread the data at the base station. For IS-95 and cdma2000, the PN sequence has a specific data pattern and a fixed length of 32,768 chips, with each chip of the PN sequence being assigned a respective PN chip index and corresponding to a specific phase of the PN sequence. The start of the PN sequence is assigned a PN chip index of 0 and the last chip on the PN sequence is assigned a PN chip index of 32,767. The PN sequence may be conceptually viewed as being placed on the circumference 310 of the circle, with the start of the PN sequence being aligned to the top of the circle (i.e., PN chip index of 0 is at the top of the PN circle). Although not shown in FIG. 3, circumference 310 is partitioned into 32,768 evenly spaced points, and each point corresponds to a respective PN chip index (i.e., a respective PN phase). The length of the PN sequence is traversed by moving around the PN circle in a clockwise direction along circumference 310.

FIG. 3 also shows a received signal 320, at a terminal, having a number of peaks corresponding to a number of signal instances (or multipaths). Due to the multipath environment, a forward modulated signal transmitted from a base station may arrive at the terminal via a number of signal paths. Each base station may also transmit one or multiple forward modulated signals, depending on whether or not it is operating in a transmit diversity mode. Thus, the received signal at the terminal may comprise multiple instances of one or more forward modulated signals from each of one or more base stations. Each multipath in the received signal is typically associated with a respective magnitude, phase, and arrival time.

Figure 4:
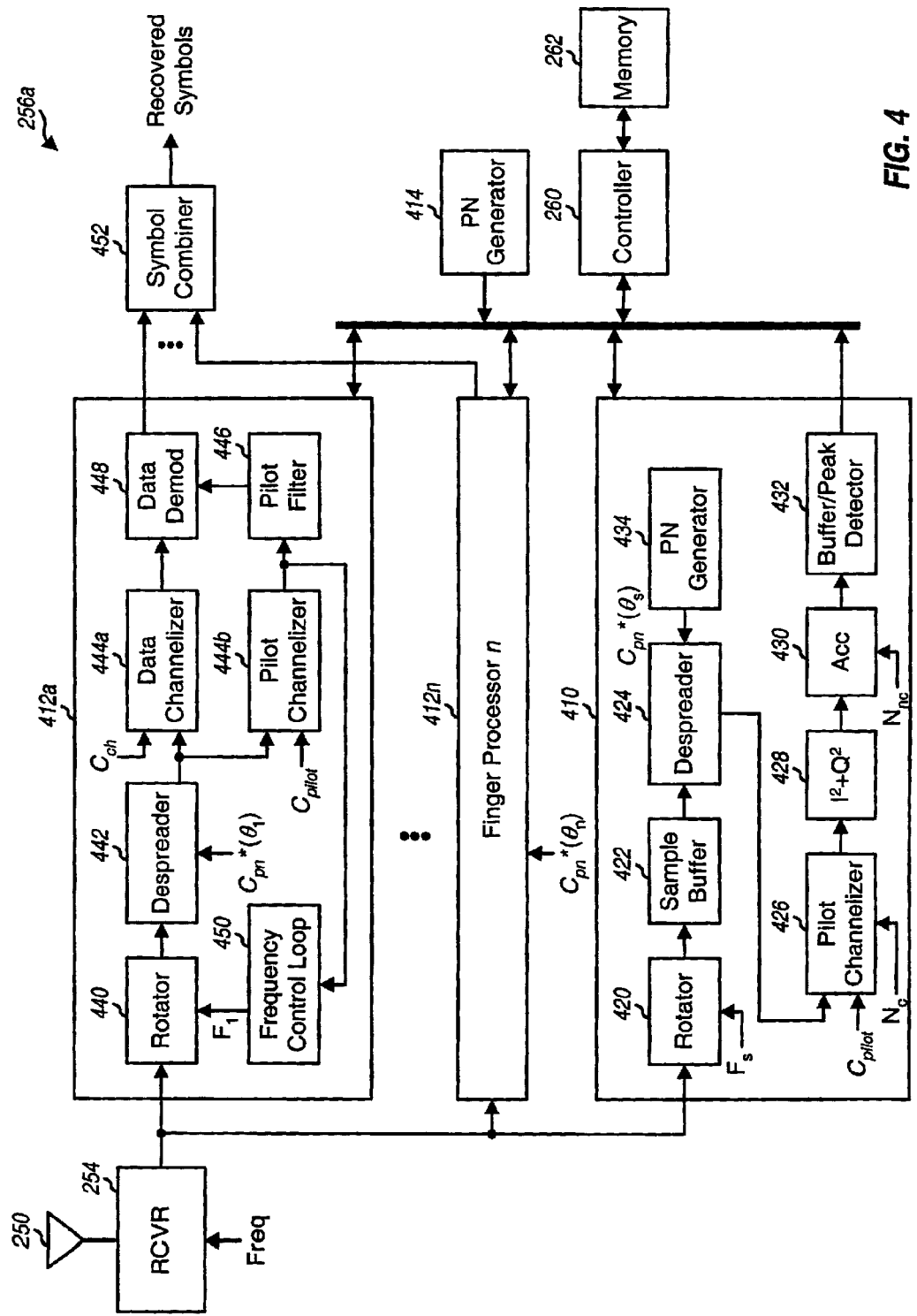
FIG. 4 is a block diagram of a rake receiver capable of implementing various aspects and embodiments of the invention.

FIG. 4 is a block diagram of a rake receiver 256a capable of implementing various aspects and embodiments of the invention. Rake receiver 256a may be used to implement demodulator 256 within terminal 106 or demodulator 234 within base station 104 in FIG. 2. Rake receiver 256a includes a searcher 410, a number of finger processors 412, and a symbol combiner 452. In a specific design, rake receiver 256a includes eight finger processors (i.e., $M_f=8$), although other designs with more or fewer finger processors may also be used.

Receiver 254 conditions (e.g., filters and amplifies) the received signal, quadrature downconverts the conditioned signal, and digitizes the downconverted signal to provide complex data samples. The quadrature downconversion and digitization may be performed in various manners, depending on the specific design of receiver 254. In one receiver design, the conditioned signal is quadrature downconverted to baseband (or near baseband) with a complex carrier signal, and the baseband signals are digitized to provide the data samples. In another receiver design, the conditioned signal is downconverted to an intermediate frequency (IF), digitized, and digitally quadrature downconverted to baseband with a complex sinusoidal signal to provide the data samples.

The data samples from receiver 254 may be expressed as:

$$D_I(k) + jD_Q(k) = \sum_i \hat{S}(\hat{\theta}_i, k) \cdot e^{j\hat{\omega}_i kT_s}, \quad \text{Eq (1)}$$

where $D_I(k)$ and $D_Q(k)$ are the inphase and quadrature data samples, respectively, at sample time index k;

$\hat{S}(\hat{\theta}_1,k)$ the i-th multipath in the received signal and is associated with a PN phase of $\hat{\theta}_1$, which includes the PN offset assigned to the transmitting base station as well as the propagation delay for this multipath;

$\hat{\omega}_i=2\pi\Delta f_i$ is the speed of rotation for the i-th multipath, where $\Delta f_i$ is the frequency error of the i-th multipath, which includes the Doppler frequency shift of the multipath and the frequency error in the downconversion of the received signal to baseband; and $T_s$ is the sample period.

The data samples from receiver 254 are provided to searcher 410 and finger processors 412 of rake receiver 256a.

Searcher 410 is used to search for strong multipaths in the received signal and to provide an indication of the strength and timing of each found multipath that meets a set of criteria. Each finger processor 412 may then be assigned to process a respective multipath of interest (e.g., a multipath of sufficient strength, as determined by controller 260 based on the signal strength information provided by searcher 410). In an aspect, finger processors 412 are also used in the pilot acquisition process, as described below.

The search for multipaths is typically performed based on the pilot included in each forward modulated signal. To search for strong multipaths, the data samples are correlated with a locally-generated PN sequence at various chip or sub-chip offsets (i.e., various PN phases). Due to the pseudo-random nature of the PN sequence, the correlation of the data samples with the PN sequence should be low, except when the phase of the locally-generated PN sequence is approximately aligned with that of a multipath, in which case the correlation results in a high value.

In the embodiment shown in FIG. 4, within searcher 410, the complex data samples are provided to a rotator 420, which performs a complex multiply of the data samples with a complex sinusoidal signal to generate frequency-translated data samples, which may be expressed as:

$$D_{rotI}(k) + jD_{rotQ}(k) = \sum_i \hat{S}(\hat{\theta}_i, k) \cdot e^{j\hat{\omega}_i kT_s} \cdot e^{-j\hat{\omega}_s kT_s}, \quad \text{Eq (2)}$$

where $\omega_S$ is the frequency (in radians/sec) of the complex sinusoidal signal used within rotator 420. This frequency, $\omega_S$, is determined by a frequency control signal, $F_s$, and may be set to zero of some other value, as described below. Rotator 420 may be used to remove phase rotation in the data samples due to Doppler frequency shift and/or downconversion frequency error.

Since the same block of frequency-translated data samples may be evaluated at various PN phases, each of which corresponds to a hypothesis for a multipath, the samples are stored to a sample buffer 422. For each hypothesis to be evaluated by the searcher, the stored data samples from sample buffer 422 are provided to a despreader 424, which also receives from a PN generator 434 a complex-conjugate PN sequence, $C_{pn}*(\theta_s)$, having a specific phase, $\theta_s$, corresponding to the hypothesis being evaluated. Despreader 424 despreads the frequency-translated data samples with the received PN sequence to provide despread samples, which may be expressed as:

$$D_{desI}(k)+jD_{desQ}(k)=[D_{rotI}(k)+jD_{rotQ}(k)]\cdot C_{pn}*(\theta_s). \quad \text{Eq (3)}$$

PN generator 434 may generate the required PN sequence on the fly, or may generate and temporarily store a number of (e.g., four) PN sequences at different phases for later use. Typically, only a particular number of data samples are processed for each hypothesis, and only a same-size segment of the PN sequence needs to be generated or retrieved from storage for the hypothesis. In an embodiment, 512 PN chips of data samples are processed for each hypothesis, although a different number of data samples may also be processed.

To detect a pilot, a pilot channelizer 426 first decovers (i.e., multiplies) the despread samples with the same channelization code, $C_{pilot}$, used to channelize the pilot at the base station (which is Walsh code zero for IS-95 and cdma2000). Pilot channelizer 426 then (coherently) accumulates the decovered pilot samples over $N_c$ PN chips to provide a complex recovered pilot symbol, $P_I+jP_Q$, which may be expressed as:

$$P_I + jP_Q = \sum_{k=1}^{N_c} [D_{rotI}(k) + jD_{rotQ}(k)] \cdot C_{pn}^*(\theta_s). \quad \text{Eq (4)}$$

The coherent accumulation time interval is typically an integer multiple of the pilot channelization code length. If the pilot is channelized with the Walsh code of zero (i.e., a sequence of 64 zeros) and the data on the other code channels are channelized with other Walsh codes, then the accumulation over $N_c=64\cdot K$ chips (where K=1, 2, and so on) effectively removes the data on the other code channels and only the pilot is extracted, if orthogonality between the code channels is maintained after transmission through the communication link.

The complex recovered pilot symbols are then squared by a squarer 428, and $N_{nc}$ squared pilot symbols are (non-coherently) accumulated by an accumulator 430 to provide a pilot energy estimate, $E_{pilot}$, for the hypothesis being evaluated. The pilot energy estimate may be expressed as:

$$E_{pilot} = \sum_{n=1}^{N_{nc}} P_I^2(n) + jP_Q^2(n). \quad \text{Eq (5)}$$

The number of squared pilot symbols to be non-coherently accumulated, $N_{nc}$, may be selected based on various considerations, as described below. The pilot energy estimate, $E_{pilot}$, is stored in a buffer/peak detector 432. After all hypotheses have been evaluated, buffer/peak detector 432 may be designed to provide a set of detected peaks for the hypotheses evaluated, as described below.

Finger processors 412 are used for data demodulation and may further be used for pilot acquisition. In the embodiment shown in FIG. 4, within each finger processor 412, the complex data samples are provided to a rotator 440, which performs a complex multiply of the data samples with a complex sinusoidal signal to generate frequency-translated data samples, $D_{f\_rotI}+jD_{f\_rotQ}$, as follows:

$$D_{f\_rotI}(k) + jD_{f\_rotQ}(k) = \sum_i \hat{S}(\hat{\theta}_l, k) \cdot e^{j\hat{\omega}_i kT_s} \cdot e^{-j\hat{\omega}_i kT_s}, \quad \text{Eq (6)}$$

where $\omega_l$ is the frequency (in radians/sec) of the complex sinusoidal signal used within rotator 440. Each multipath may be associated with a different Doppler frequency shift, and rotator 440 attempts to remove the phase rotation of the assigned multipath due to Doppler frequency shift and downconversion frequency error. The frequency, $\omega_i$, of the complex sinusoidal signal used within rotator 440 is an estimate of the frequency error, $\hat{\omega}_i$, for the assigned multipath (i.e., $\omega_i \approx \hat{\omega}_i$). The frequency, $\omega_i$, may be determined by a frequency control loop 450, which is described below.

The frequency-translated data samples from rotator 440 are provided to a despreader 442, which also receives (e.g., from a PN generator 414) a complex-conjugate PN sequence, $C_{pn}^*(\theta_t)$, having a phase $\theta_t$ corresponding to the arrival time of the assigned multipath. This PN phase, $\theta_t$, is identified by searcher 410 in the detection process. Despreader 442 despreads the frequency-translated data samples with the received PN sequence to provide despread samples.

To recover the pilot, a pilot channelizer 444b first decovers the despread samples with the same channelization code, $C_{pilot}$, used to channelize the pilot at the base station, and further accumulates the decovered pilot samples over a particular accumulation time interval to provide recovered pilot symbols. The pilot accumulation time interval is typically an integer multiple of the pilot channelization code length (i.e., $N_c=64\cdot K$, where K is an integer one or greater). The recovered pilot symbols are then filtered by a pilot filter 446 to provide pilot estimates.

To recover the data on a particular code channel, a data channelizer 444a first decovers the despread samples with the same channelization code, $C_{ch}$, used for the code channel being recovered, and further accumulates the decovered data samples over the length of the channelization code, $C_{ch}$, to provide data symbols. A data demodulator 448 then receives and demodulates the data symbols with the pilot estimates to generate demodulated symbols, which are then provided to symbol combiner 452. Symbol combiner 452 receives and coherently combines the demodulated symbols from all finger processors 412 assigned to process the received signal, and provides recovered symbols to RX data processor 258 for further processing. The data demodulation and symbol combining may be achieved as described in U.S. Pat. Nos. 5,764,687 and 5,490,165, which are incorporated herein by reference.

In the embodiment shown in FIG. 4, frequency control loop 450 is provided in each finger processor 412 and is used to acquire and track the frequency of the multipath assigned to the finger processor. The frequency error in the multipath (i.e., the Doppler frequency plus the downstream frequency error) is reflected in the phase rotation of the pilot, with a larger frequency error corresponding to a higher rate of phase rotation. Frequency control loop 450 typically includes a frequency detector and a loop filter. The frequency detector provides estimates of the frequency error, $\Delta f_i$, of the assigned multipath, which may be determined based on the phase difference between consecutive pilot symbols. The loop filter then filters the frequency error estimates to provide a frequency control, $F_i$, which is indicative of the estimated frequency error in the assigned multipath. Rotator 440 receives the frequency control and adjusts the frequency of its complex sinusoidal signal by the indicated amount but in the opposite direction to reduce the frequency error (and the phase rotation) of the multipath. Frequency tracking based on the pilot symbols is described in further detail in U.S. patent application Ser. No. 09/950, 744, entitled "METHOD AND APPARATUS FOR PERFORMING FREQUENCY TRACKING BASED ON DIVERSITY TRANSMITTED PILOTS IN A CDMA COMMUNICATION SYSTEM," filed Sep. 10, 2001, assigned to the assignee of the present application and incorporated herein by reference.

Aspects of the invention provide techniques to acquire pilots over code space and/or frequency errors. In one aspect, the pilot acquisition is performed using a number of substages, and some of the substages are pipelined and performed in parallel using different processing elements to shorten the acquisition time. Various pilot acquisition schemes are also provided to acquire pilots using multiple (e.g., two) stages. Each stage of a multi-stage scheme may employ a different set of parameter values to improve the likelihood of pilot acquisition for different operating conditions. The multi-stage schemes may advantageously incorporate pipelining and parallel processing to reduce acquisition time.

In another aspect, the full range of possible frequency errors for the pilots is divided into a number of frequency bins. A multi-stage acquisition scheme is then used to evaluate the frequency bins, and one or more stages may be used for each bin. The multi-stage scheme may incorporate the pipelining and parallel processing such that the searcher may perform a search for the next set of peaks in the next frequency bin while the finger processors attempt acquisition of the current set of peaks found for the current frequency bin. Various aspects and embodiments of the invention are described in further detail below.

If the terminal is not aware of its location and/or system time (e.g., for the initial acquisition at power-on), then a full search for the pilots may need to be performed over the entire PN code space. Various schemes may be used for the full search for pilots. In one scheme, a sequential search is performed over the entire code space, all peaks found above a particular energy threshold are provided as detected peaks, and acquisition may then be attempted on these detected peaks. In another scheme, the entire code space is swept during a detection step, and acquisition is then attempted on a set of largest peaks found during the detection step. In yet another scheme, the entire code space is swept during a detection step, a set of peaks found during the detection step is re-evaluated during a dwell step to find candidate peaks, and acquisition is then attempted on these candidate peaks. A number of pilot search schemes may thus be used. For clarity, various aspects and embodiments of the invention are described for the third scheme whereby the entire code space is swept and detected peaks are re-evaluated to find the candidate peaks on which acquisition is then attempted.

Figure 5:
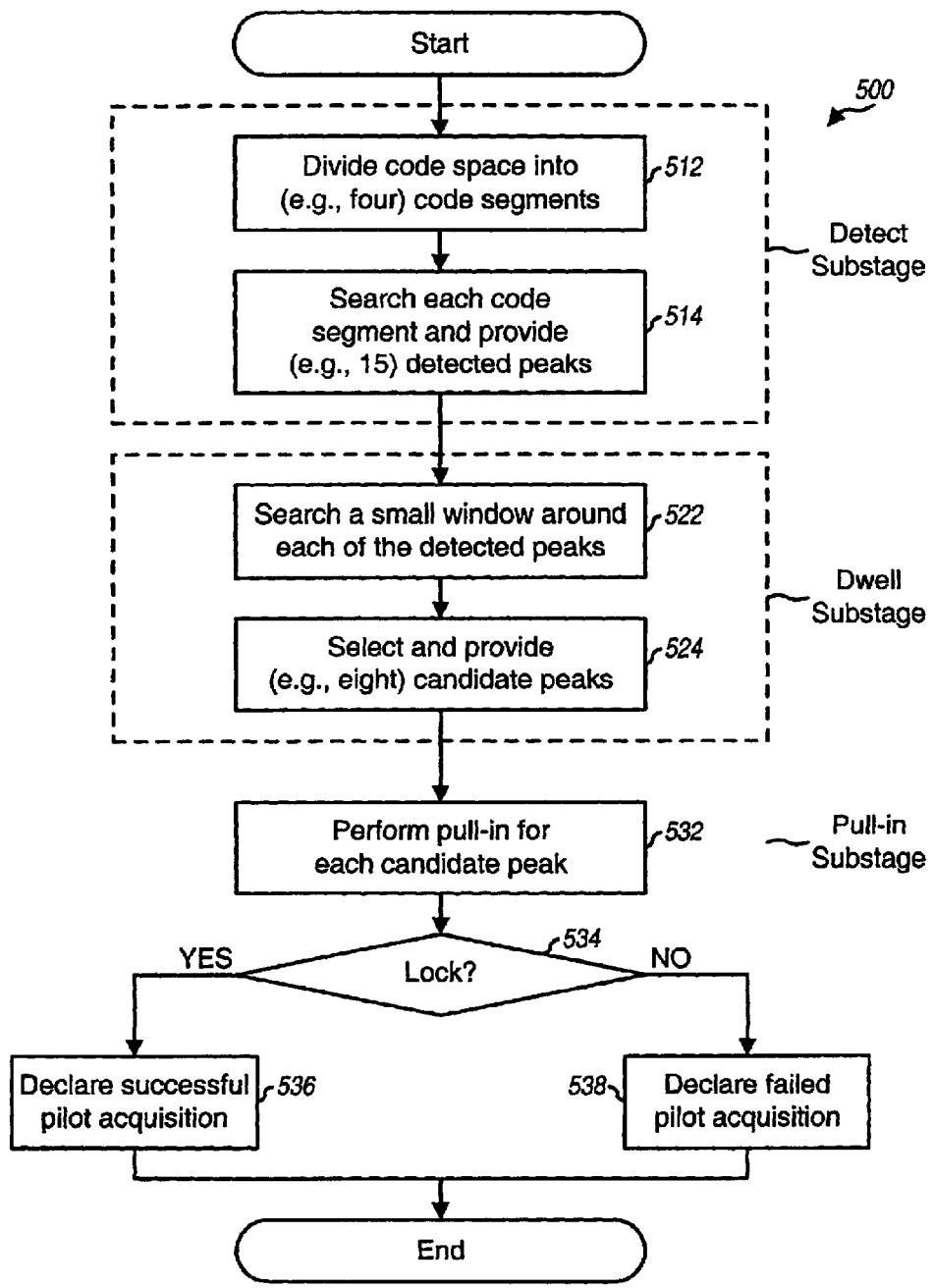
FIG. 5 is a flow diagram of an embodiment of a single stage that may be used to search for and acquire pilots in a designated code space.

FIG. 5 is a flow diagram of an embodiment of a stage 500 that may be used to search for and acquire pilots in a designated code space. Stage 500 includes three substages—detect, dwell, and pull-in substages. The detect and dwell substages perform a search for peaks over the designated code space, and the pull-in substage performs acquisition of candidate peaks over frequency errors.

For the detect substage, the entire code space to be searched is initially divided into a number of non-overlapping code segments, at step 512. The number of code segments and the size of each code segment may be selected based on the specific design of the searcher. As an example for a full search in IS-95 and cdma2000, the entire code space of 32,768 PN chips may be divided into four code segments, with each code segment including 8192 chips (i.e., $W_S = 8192$). In an embodiment, the four code segments may be searched in parallel by four search units within the searcher (each search unit may be implemented as shown in FIG. 4 for searcher 410). Each code segment is then searched, and a particular number of detected peaks are provided, at step 514. The detected peaks are typically the largest peaks found in the code segment. In a specific embodiment, 15 detected peaks are provided for each code segment, and a set of $M_{det}=60$ detected peaks is provided by the detect substage for the four code segments.

For the dwell substage, a search is performed over a window centered at each of the detected peaks, at step 522. This window includes a smaller number of PN chips than the code segment (e.g., a window of 5 PN chips, or $W_S=5$). A particular number of the candidate peaks from all searches in step 522 are then selected and provided, at step 524. The candidate peaks are also typically the largest peaks found for all searches by the dwell substage. The number of candidate peaks provided by the dwell substage may be equal to the number of finger processors available for use for acquisition (i.e., $M_{dw}=M_f$), although more or fewer candidate peaks may also be provided by the dwell substage (e.g., depending on the desired probability of detection). In a specific embodiment, a set of $M_{dw}=8$ candidate peaks is provided by the dwell substage for the designated code space.

For the pull-in substage, a finger processor is initially assigned to each candidate peak provided by the dwell substage, and each finger processor then attempts to acquire and lock to the frequency and timing of the assigned peak, at step 532. The frequency pull-in may be achieved by the frequency control loop included in the finger processor (and acquisition of the multipath timing may be achieved by a time control loop that may also be included in the finger processor but is not shown in FIG. 4 for simplicity). If a lock to at least one candidate peak is achieved, as determined in step 534 and described below, then a successful pilot acquisition is declared, at step 536. Otherwise, an acquisition failure is declared at step 538 and other actions may be performed. In either case, the stage terminates.

FIG. 5 shows a basic stage that may be used to form numerous pilot acquisition schemes, some of which are described below.

The detect and dwell substages are used to provide improved probability of pilot detection over the designated code space. The detect substage may provide a number of noise peaks, some of which may be comparable in magnitude or may even be larger than the peaks for the pilots. The dwell substage then re-evaluates each detected peak to verify whether the peak is due to signal or noise. If the noise is random and independent (i.e., uncorrelated), then there is a small likelihood of two large noise peaks occurring at the same PN phase at different times. Thus, in an embodiment, the detect and dwell substages are performed over different sets of data samples obtained at different times. The correlation of another set of data samples with the PN sequence by the dwell substage reduces the number of noise peaks and thus the probability of false pilot detection.

In an embodiment, the detect and dwell substages are each associated with a set of values for the parameters $N_c$ and $N_{nc}$. The parameter $N_c$ represents the number of chips for coherent accumulation, and the parameter $N_{nc}$ represents the number of pilot symbols for non-coherent accumulation. These parameters determine the performance of the pilot detection, which may be quantified by the probability of detecting a pilot at various frequency errors and received signal qualities ($E_{cp}/I_o$).

Figure 9:
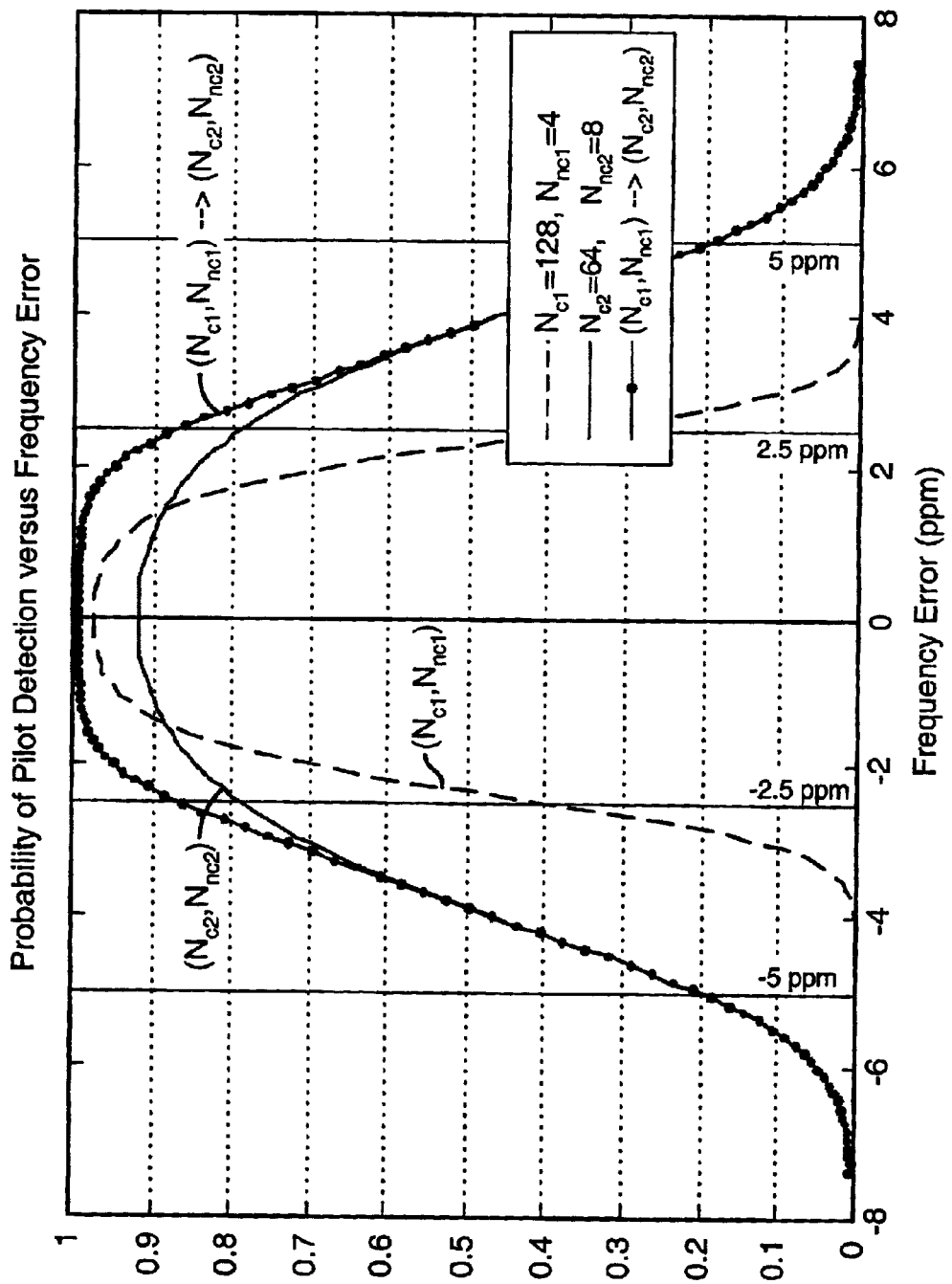
FIG. 9 illustrates the probability of detecting a single plot versus frequency error.

FIG. 9 is a diagram showing the probability of detecting a single pilot versus frequency error (in units of ppm in the PCS band). The plots in FIG. 9 were obtained for two sets of parameter values and a received signal quality of $E_{cp}/I_o=-14$ dB. Plot 912 shows the probability of pilot detection with $N_{c1}=128$ and $N_{nc1}=4$, plot 914 shows the probability of pilot detection with $N_{c2}=64$ and $N_{nc2}=8$, and plot 916 shows the overall probability of pilot detection for a two-stage scheme that employs the above two sets of parameter values. These are simulated results and actual performance will likely differ.

As shown by the plots, different sets of parameter values may be more suited for different operating conditions. For example, the parameter value set of $N_c=128$ and $N_{nc}=4$ has higher sensitivity (i.e., can detect pilots with low $E_{cp}/I_o$) and provides improved probability of detection for small frequency errors. Conversely, the parameter value set of $N_c=64$ and $N_{nc}=8$ has reduced sensitivity but provides improved probability of detection for larger frequency errors.

Other schemes to search for pilots over the designated code space may also be implemented, and this is within the scope of the invention. For example, a single detect substage may be used (i.e., no dwell substage) and the re-evaluation of each detected peak may be omitted or performed immediately after detection (e.g., based on a different block of data samples). As another example, multiple dwell substages may be performed to further reduce the probability of false detection.

Figure 6:
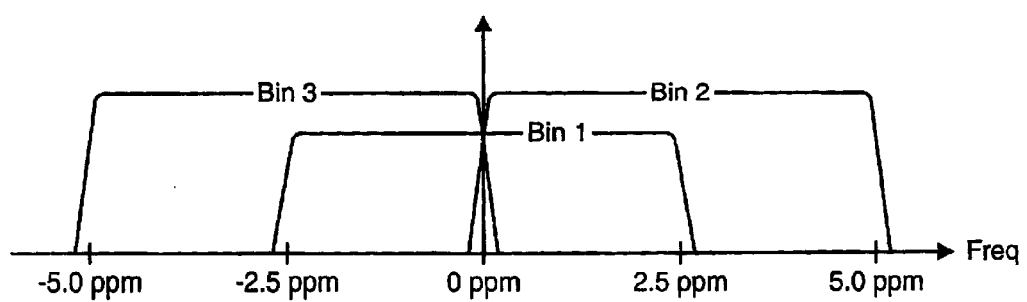
FIG. 6 is a diagram illustrating the partitioning of a range of frequency errors into multiple frequency bins.

FIG. 6 is a diagram illustrating a range of frequency errors over which pilots may be found. As noted above, each multipath may be associated with a respective Doppler frequency shift due to movement by the terminal. Depending on the frequency band for the forward modulated signal (e.g., PCS or cellular) and the velocity of the terminal, the Doppler frequency shift may be in the order of several parts per million (ppm). The ±5 ppm of frequency errors in FIG. 6 represents the total expected frequency error due to Doppler frequency shift as well as downconversion frequency error (since frequency lock has not yet been achieved). A different range of frequency errors may be expected for other CDMA systems.

In an aspect, the frequency error range is partitioned into a number of frequency bins (or simply, bins), and pilot acquisition is performed for each bin. For the example shown in FIG. 6, the total frequency error range of ±5 ppm is partitioned into three bins, with bin 1 covering −2.5 to +2.5 ppm of frequency errors, bin 2 covering 0 to 5 ppm of frequency errors, and bin 3 covering −5 to 0 ppm of frequency errors. In general, any number of frequency bins may be formed, and the bins may or may not overlap.

Partitioning the total frequency error range into bins and performing pilot acquisition for each bin can shorten the overall acquisition time. In an embodiment, the frequency bins may be searched in a particular order based on the likelihood of finding the pilots in the bins. For example, the bins centered near zero frequency error may be searched first, and the bias further away from zero frequency error may be searched later. The pilot acquisition may be terminated early upon finding pilots in the more likely bins. Additionally, acquisition of pilots may also be achieved more quickly for smaller frequency bins. In particular, the time required for the frequency control loop to pull-in a particular frequency error is typically more than a linear function of the frequency error, and the time required to pull-in a frequency error of 2.5 ppm may be less than half of the time required to pull-in a frequency error of 5 ppm. Some main reasons for binning the frequency errors include (1) reduced searcher visibility with increasing frequency error (as shown in FIG. 9) and (2) inability of the AFC to accurately measure frequency errors beyond its pull-in range.

Figure 7:
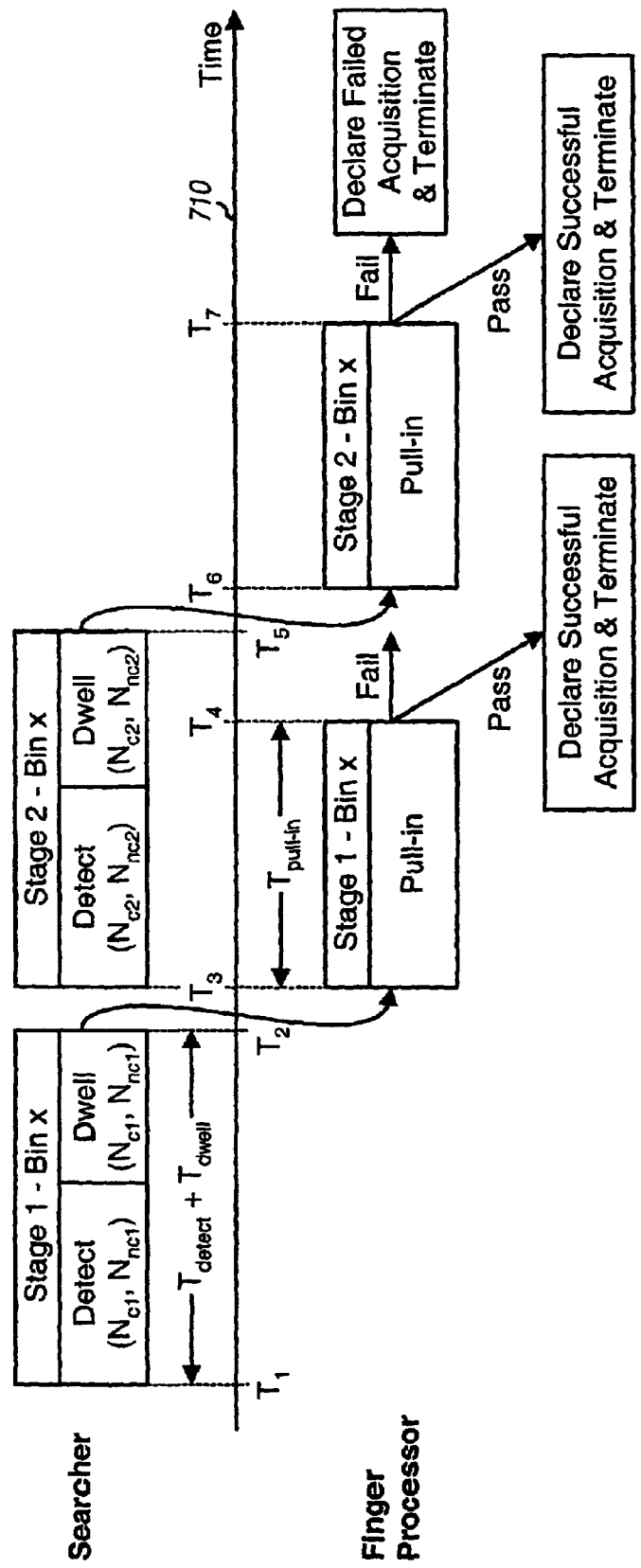
FIG. 7 illustrates an embodiment of a two-stage pilot acquisition scheme with early termination upon successful pilot acquisition.

FIG. 7 illustrates a two-stage pilot acquisition scheme with early termination upon successful pilot acquisition, in accordance with an embodiment of the invention. This two-stage scheme may be used to acquire a particular range of frequency errors. For clarity, the processing for both stages is shown along a timeline 710, with the processing performed by the searcher being shown above the timeline and the processing performed by the finger processors being shown below the timeline.

Initially, at time $T_1$, the sample buffer (e.g., buffer 422 in FIG. 4) in the searcher is loaded with frequency-rotated data samples derived from the received signal. The searcher then performs the detect substage and searches for pilots over the designated code space by correlating the data samples with PN sequences at various phases. From the detect substage, the searcher provides a set of (e.g., $M_{det}$=60) detected peaks. The searcher then performs the dwell substage and re-evaluates each of the detected peaks. This may be achieved by performing a search over a small window (e.g., of 5 PN chips) centered on each detected peak. From the dwell substage, the searcher provides a set of (e.g., $M_{dw}$=8) candidate peaks for pull-in.

In one specific embodiment, for the first stage, the parameter values for the detect substage are $N_c$=128, $N_{nc}$=4, and $W_S$=8192, where $W_S$ is the search window size (in number of PN chips), and the parameters values for the dwell substage are $N_c$=128, $N_{nc}$=4, and $W_S$=5. As shown in FIG. 9, the parameter values of $N_c$=128 and $N_{nc}$=4 provide improved probability of pilot detection for small frequency errors, which may be the more likely scenario. The parameter values for the detect substage may also be selected to be different from those for the dwell substage. Other parameter values may also be used for the detect and dwell substages, and this is within the scope of the invention.

At time $T_2$, the dwell substage for the first stage is completed, and each of the candidate peaks from this substage is assigned to, and processed by, a respective finger processor. In an embodiment, the pull-in substage is performed for a particular time interval, $T_{pull-in}$, and a timer is reset to this value at the start of the pull-in substage. The pull-in time interval, $T_{pull-in}$, is common to all finger processors, and may be selected based on various considerations, as described below. A received signal strength indicator (RSSI) is used to measure the signal strength (or energy) of the pilot recovered by each finger processor, and is also reset to a particular value (e.g., −30 dB) at the start of the pull-in substage. The RSSI may be implemented in each finger processor (not shown in FIG. 4) or, alternatively, the pilot energy computation may be performed by controller 260 or some other unit. Within each finger processor, the frequency control loop then attempts to acquire and lock to the frequency of the assigned peak, starting at time $T_3$.

With phase rotation in the data samples (e.g., due to Doppler frequency shift), the RSSI output is typically noticeably smaller than the actual signal level of the assigned peak. Thus, the RSSI output may be used as a means to detect whether or not the frequency control loop has achieved lock. In an embodiment, if the RSSI output for at least one assigned finger processor exceeds a particular energy threshold before the pull-in timer expires, then a successful pilot acquisition is declared. If the RSSI outputs for all assigned finger processors remain below the energy threshold at the end of the pull-in time interval, then a failed pilot acquisition is declared. And if the RSSI outputs for multiple finger processors exceed the energy threshold, then successful pilot acquisition may be declared on either (1) the finger processor with the highest RSSI output or (2) multiple finger processors with RSSI outputs exceeding the energy threshold.

At time $T_4$, the pull-in substage for the first stage terminates with an indication of either a successful or a failed pilot acquisition. If a successful pilot acquisition is declared, then the two-stage pilot acquisition scheme terminates, and the terminal may thereafter (e.g., sequentially) perform acquisition (e.g., of the Sync and Paging channels) of one or more base stations (e.g., the best base station, all acquired base stations, or a subset of the acquired base stations) to receive and/or exchange data with the base station(s). Otherwise, if a failed pilot acquisition is declared, then the pilot acquisition process continues.

In an aspect and as shown in FIG. 7, to reduce the time to acquire the pilots, the detect and dwell substages for the next stage is performed in parallel and in a pipelined manner along with the pull-in substage for the current stage. The detect and dwell substages may be performed by the searcher, and the candidate peaks for a given dwell substage may be assigned to the finger processors for pull-in. The use of multiple finger processors to concurrently perform pull-in for multiple peaks is supported by the individual frequency control loop within each finger processor, and reduces the time required to perform the pull-in substage. Parallel operation of the detect and dwell substages by the searcher and the pull-in substage by the finger processors also shortens acquisition time.

Starting at time $T_3$, while the pull-in substage is being performed by the finger processors on the candidate peaks from the dwell substage of the first stage, the detect and dwell substages for the second stage are performed by the searcher. In an embodiment, the detect substage for the second stage may be performed on the same block of data samples used for the dwell substage for the first stage.

In one specific embodiment, the parameter values for the detect substage of the second stage are $N_c=64$, $N_{nc}=8$, and $W_S=8192$, and the parameter values for the dwell substage of the second stage are $N_c=64$, $N_{nc}=8$, and $W_S=5$. As shown in FIG. 9, these parameter values provide improved probability of pilot detection for larger frequency errors, which may be the more likely scenario since acquisition failed for the first stage. However, other parameter values may also be used for the detect and dwell substages, and this is within the scope of the invention.

At time $T_5$, the dwell substage for the second stage is completed. Pull-in is then performed on each of the candidate peaks provided by the dwell substage, starting at time $T_6$, and may be performed in similar manner as that described for the first stage. At time $T_7$, the pull-in substage for the second stage terminates with an indication of either a successful or a failed pilot acquisition. If a successful pilot acquisition is declared, then the terminal may thereafter perform system acquisition (e.g., of the Sync and Paging channels) of one or more base stations to receive and/or exchange data with the base station(s). Otherwise, other actions may be performed.

As noted above, each stage may be designed to tradeoff between various factors such as probability of detection, speed of searching, maximum frequency error that may be acquired, and so on. The two-stage scheme described above with two different sets of parameter values provides (relatively) high probability of pilot detection for a smaller range of frequency errors (e.g., a range of ±2.5 ppm, as show in FIG. 9).

For simplicity, FIG. 7 shows a two-stage scheme. In general, any number of stages may be implemented, and the stages may be designed and pipelined in any manner to provide the desired performance. Each stage may be associated with a respective set of parameter values for the detect and dwell substages.

In an aspect, the frequency error range may be partitioned into a number of frequency bins. The pilot acquisition may then be performed for each frequency bin to provide improved results for larger frequency errors, as described below.

Figure 8:
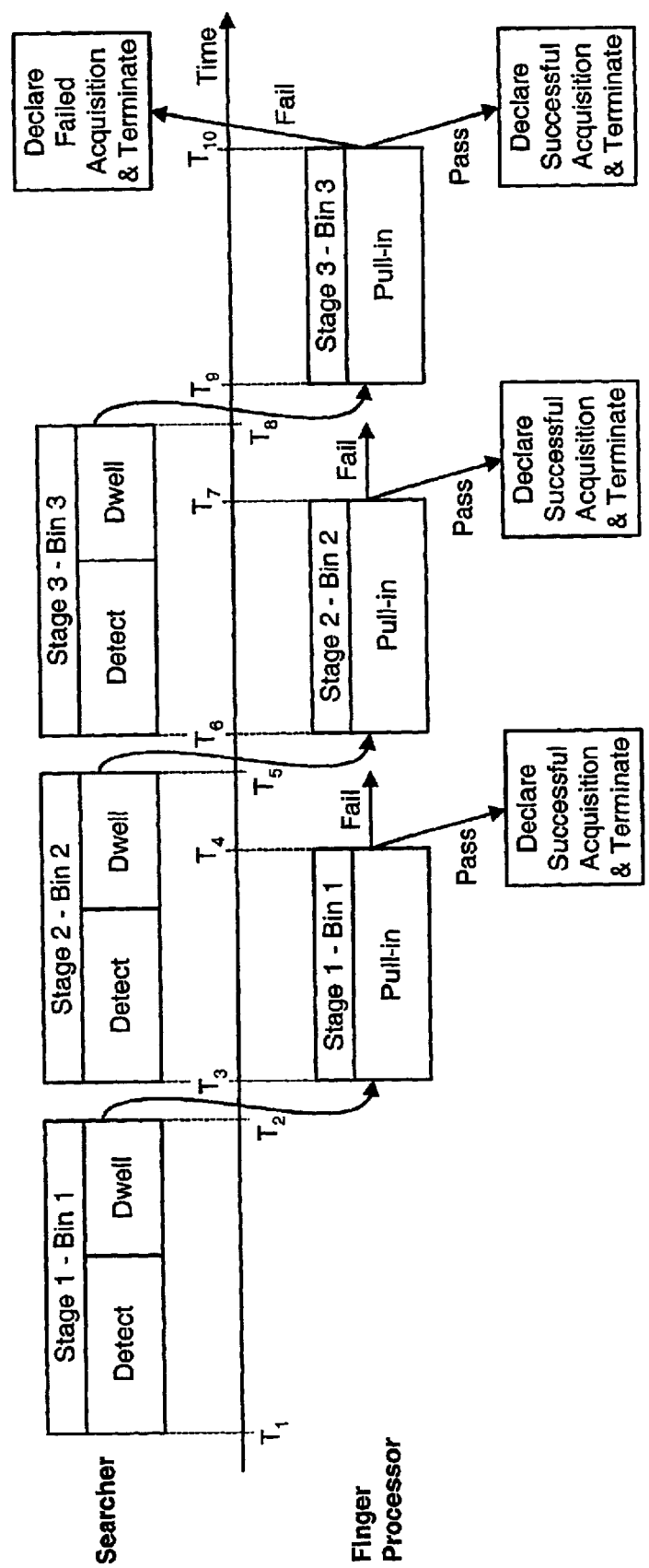
FIG. 8 illustrates an embodiment of a multi-stage pilot acquisition scheme for multiple frequency bins and with early termination upon successful pilot acquisition.

FIG. 8 illustrates a multi-stage pilot acquisition scheme for multiple frequency bins and with early termination upon successful pilot acquisition, in accordance with another embodiment of the invention. The multi-stage scheme shown in FIG. 8 may be used for pilot acquisition for three frequency bins, which may be formed as shown in FIG. 6.

Initially, at time $T_1$, the searcher prepares to process bin 1 by applying the proper frequency control, $F_s$, to its rotator 420 such that the frequency-translated data samples are centered at approximately DC (i.e., corrected for downconversion frequency error but not Doppler frequency shifts).

The searcher then performs the detect substage for bin 1 whereby it searches for pilots over the designated code space and provides a set of (e.g., $M_{det}=60$) detected peaks. The searcher next performs the dwell substage whereby it re-evaluates each of the detected peaks and provides a set of (e.g., $M_{dw}=8$) candidate peaks for pull-in. In one specific embodiment, the parameter values of $N_c=128$ and $N_{nc}=4$ are used for both the detect and dwell substages, although other parameter values may also be used and are within the scope of the invention.

At time $T_2$, the dwell substage for bin 1 is completed, and each of the candidate peaks from this substage is assigned to, and processed by, a respective finger processor. Each finger processor prepares to process bin 1 by applying the proper frequency control, $F_i$, to its rotator 440 such that the frequency-translated data samples are centered at approximately DC. Each finger processor then performs the pull-in substage for the pull-in time interval, $T_{pull-in}$, and its frequency control loop attempts to acquire and lock to the frequency of the assigned peak, starting at time $T_3$. The RSSI for each finger processor is also reset to a particular value (e.g., −30 dB) at the start of the pull-in substage and is used to measure the signal strength (or energy) of the pilot. At time $T_4$, the pull-in substage for bin 1 terminates with an indication of either a successful or a failed pilot acquisition by each finger processor. If successful pilot acquisition is declared by at least one finger processor, then the multi-stage scheme terminates, and the terminal may thereafter perform acquisition (e.g., of the Sync and Paging channels) of one or more base stations to receive and/or exchange data with the base station(s). Otherwise, if failed pilot acquisition is declared by all finger processors, then the pilot acquisition continues.

In an aspect and as shown in FIG. 8, the detect and dwell substages for the next stage for bin 2 is performed in parallel and in a pipelined manner along with the pull-in substage for bin 1. Parallel operation of the detect and dwell substages by the searcher and the pull-in substage by the finger processors on different frequency bins is supported by the individual rotators within the searcher and finger processors. Thus, starting at approximately time $T_3$, while the pull-in substage for bin 1 is performed by the finger processors, the detect and dwell substages for bin 2 are performed by the searcher.

The searcher prepares to process bin 2 by applying the proper frequency control, $F_s$, to its rotator 420 such that the frequency-translated data samples are frequency-translated to approximately the center of bin 2 (e.g., +2.5 ppm for the example shown in FIG. 6). The searcher then performs the detect substage for bin 2 whereby it searches for pilots over the designated code space and provides a set of detected peaks. The searcher next performs the dwell substage whereby it re-evaluates each detected peak and provides a set of candidate peaks for pull-in. In one specific embodiment, the same set of parameter values of $N_c=128$ and $N_{nc}=4$ is used for the detect and dwell substages for all bins, although other parameter values may also be used and are within the scope of the invention.

At time $T_5$, the dwell substage for bin 2 is completed. Pull-in is then performed on each of the candidate peaks from the dwell substage, starting at time $T_6$, and may be performed in similar manner as that described above for bin 1. However, each finger processor prepares to process bin 2 by applying the proper frequency control, $F_i$, to its rotator 440 such that the frequency-translated data samples are frequency-translated to approximately the center of bin 2 (e.g., 2.5 ppm). AT time $T_7$, the pull-in substage for bin 2 terminates with an indication of either a successful or a failed pilot acquisition by each finger processor. If successful pilot acquisition is declared by at least one finger processor, then the multi-stage scheme terminates, and the terminal may thereafter perform acquisition (e.g., of the Sync and Paging channels) of one or more base stations. Otherwise, if failed pilot acquisition is declared by all finger processors, then the pilot acquisition continues.

The detect and dwell substages for the next stage for bin 3 is performed in parallel and in a pipelined manner along with the pull-in substage for bin 2, starting at approximately time $T_6$. The searcher prepares to process bin 3 by applying the proper frequency control, $F_s$, to its rotator 420 such that the frequency-translated data samples are frequency-translated to approximately the center of bin 3 (e.g., −2.5 ppm for the example shown in FIG. 6). The searcher then performs the detect substage for bin 3 whereby it searches for pilots over the designated code space and provides a set of detected peaks. The searcher next performs the dwell substage whereby it re-evaluates each detected peak and provides a set of candidate peaks for pull-in.

At time $T_8$, the dwell substage for bin 3 is completed. Pull-in is then performed on each of the candidate peaks from the dwell substage, starting at time $T_9$, and may be performed in similar manner as that described above for bins 1 and 2. However, each finger processor prepares to process 3 by applying the proper frequency control, $F_j$, to its rotator 440 such that the frequency-translated data samples are frequency-translated to approximately the center of bin 3 (e.g., −2.5 ppm). At time $T_{10}$, the pull-in substage for bin 3 terminates with an indication of either a successful or a failed pilot acquisition by each finger processor.

If successful pilot acquisition is declared by at least one finger processor, then the multi-stage pilot acquisition scheme terminates and the terminal may thereafter perform system acquisition (e.g., of the Sync and Paging channels) of one or more base stations. Otherwise, if failed pilot acquisition is declared by all finger processors, then other actions may be performed.

FIG. 8 shows an example three-stage pilot acquisition scheme for three frequency bins. In general, any number of stages may be implemented for any number of bins. For example, a two-stage scheme may be implemented for two frequency bins 2 and 3. Moreover, multiple stages with different parameter values may be used for each frequency bin. For example, the two-stage scheme in FIG. 7 may be combined with the three-stage scheme in FIG. 8 such that two stages with two different sets of parameter values are performed for each frequency bin. The two stages for each bin may be performed sequentially before moving on to the next bin (e.g., stages 1 and 2 for bin 1, then stages 3 and 4 for bin 2, then stages 5 and 6 for bin 3), or may be interlaced (e.g., stages 1, 2, and 3 for bins 1, 2, and 3, then stages 4, 5, and 6 for bins 1, 2, and 3) to improve the average acquisition time across frequency bins.

The pilot acquisition scheme may also be designed to match the expected operating conditions. For example, a four-stage scheme may be designed with the first two stages being implemented as shown in FIG. 7, followed by the second and third stages shown in FIG. 8. The first stage of this scheme may be used for the most likely operating conditions of strong pilots (i.e., high $E_{cp}/I_o$) and small frequency errors, the second stage may be used for the next most likely operating conditions of weak pilots (i.e., low $E_{cp}/I_o$) and small frequency errors, and the last two stages may each be used for the next most likely operating conditions of weak pilots and large frequency errors.

As noted above, upon successful acquisition of at least one candidate peak, the acquired peak(s) are typically tracked by their respective enabled finger processor(s). System acquisition may thereafter be performed on each of one or more acquired peaks. Whereas the initial acquisition is performed to acquire the frequency and timing of the peaks, the system acquisition attempts to demodulate and decode certain code channels (e.g., Sync and/or Paging channels) to recover data and/or messages that may be directed the terminal.

In one embodiment, the system acquisition is performed for the peak with the best RSSI output that exceeds the lock threshold at the end of the pull-in time interval. In another embodiment, the system acquisition is performed for multiple peaks that exceed the lock threshold at the end of the pull-in time interval. For this embodiment, multiple peaks from multiple base stations may be combined (if "soft handoff" is used and data is redundantly transmitted from multiple base stations) to obtain improved performance, or multiple peaks from a single base station may be combined (if "softer handoff" is used and data is not transmitted from multiple base stations, as for the paging channel in IS-95 and cdma2000.

Certain acquisition information may be retained (temporarily stored) for the acquired peaks not selected for system acquisition. Such information may include, for example, the PN phase, frequency error, RSSI output, and so on, for the peak. This acquisition information may be recalled later and used for various functions such as, for example, as an aid in quick hand-off after system acquisition.

Search Parameters

For clarity, a specific design for the detect, dwell, and pull-in substages is described below. In general, the pilot acquisition schemes may be implemented to match the capabilities of the searcher and finger processor hardware. The substages may also be implemented to achieve as much parallel processing as possible to more fully utilize the available hardware.

The detect substage performs an initial search over the designated code space to find peaks. For a specific searcher design, the search over all (e.g., four) code segments may be performed in parallel by a corresponding number of (e.g., four) searcher units. The time required for the detect substage may be expressed as:

$$T_{detect} = \frac{N_c \cdot N_{nc} \cdot W_S}{64 \cdot F_{chip}} + 128 = 53.4 \text{ msec}, \quad \text{Eq (7)}$$

where $N_c \cdot N_{nc}$=512, $W_S$=8192, and the denominator of $64 \cdot F_{chip}$ is related to the speed of the searcher hardware. The factor of 128 accounts for overhead (e.g., to fill up the sample buffer in the searcher). As shown in equation (7), the detect time increases for larger $N_c$ and $N_{nc}$, and for a larger size code segment, $W_S$.

The dwell substage re-evaluates each peak provided by the detect substage to reduce the number of noise peaks, which then reduces the time required for the subsequent pull-in substage since finger processors do not need to be assigned to these false peaks. The search window for the dwell substage is selected to account for the worse case drift in the peaks between the detect and dwell substages. The perceived time drift in the peaks may be due to various factors such as, for example, the drift in a precision local oscillator used to provide the clock signals for the terminal, movement by the terminal, and so on.

If the local oscillator drifts by α ppm between the detect and dwell substages, then the peaks in the received signal will be perceived to have moved relative to the timing of the terminal. If a window size of 5 PN chips (i.e., ±2 PN chips from the nominal value) is used for the dwell substage, then the maximum amount of local oscillator drift that can be tolerated may be determined as:

$$\frac{\alpha \cdot 10^6}{1.2288 \cdot 10^6} \cdot T_{detect} = 2 \text{ chips}, \qquad \text{Eq (8)}$$

$$\alpha = 46 \text{ ppm.}$$

If the terminal moves at a rate of β relative to the base station, then the peaks will also be perceived to have moved relative to the timing of terminal. For a maximum velocity of 500 km/hr (e.g., for a high speed train), the drift in the peaks may be determined as:

$$\frac{500 \text{ km/hr} \cdot T_{detect} \text{sec}}{\text{velocity of light in m/sec}} \cdot 1.2288 \cdot 10^6 \text{ chips/sec} = \qquad \text{Eq (9)}$$

$$0.3072 \text{ chips}/T_{detect},$$

which is less than the dwell search window size with two chips on each side of the peak.

Other window sizes may also be used for the dwell substage (e.g., to account for other errors), and this is within the scope of the invention.

For a specific searcher design whereby the detected peaks for all four code segments may be re-evaluated in parallel by four searcher units, the time required for the dwell substage may be expressed as:

$$T_{dwell} = \frac{(N_c \cdot N_{nc} + 128)}{1.2288 \cdot 10^6} \cdot \frac{M_{det}}{4} = 7.8 \text{ msec.} \qquad \text{Eq (10)}$$

As shown in equation (10), the dwell time increases for larger $N_c$ and $N_{nc}$, and if more detected peaks are re-evaluated (i.e., a larger $M_{det}$).

The pull-in substage attempts to acquire and lock to the candidate peaks provided by the dwell substage. The time required for the pull-in substage is determined based in part on the design of the frequency control loop. In a specific embodiment, the frequency control loop is designed with a time constant, $\tau_{ftl}$, of approximately 1.2 msec for a worse case frequency error of 5 ppm at a worse case received signal quality of $E_{cp}/I_o$=−15 dB. The pull-in time for the frequency control loop may be estimated as five times the time constant (i.e., $T_{ftl} \approx 5 \cdot \tau_{ftl}$), and the pull-in time for the pull-in substage may be selected as eight times the loop pull-in time (i.e., $T_{pull-in} \approx 8 \cdot T_{ftl} \approx 50$ msec). A longer substage pull-in time, $T_{pull-in}$, provides time diversity in a fading environment. Other values for the pull-in time, $T_{pull-in}$, may also be used, and this is within the scope of the invention.

The frequency control loop may also be designed with multiple operating modes, with each mode designed for specific operating conditions. For example, the frequency control loop may be designed with an acquisition mode having a wider loop bandwidth used for faster acquisition of a peak, a tracking mode having a more narrow loop bandwidth used to provide reduced phase noise after acquisition, and so on. The various operating modes may be associated with the same or different frequency detector designs. Also, the particular operating mode to be used may be selected based on the expected operating conditions. For example, a wide loop bandwidth may be used for the first stage to acquire pilots expected to have high $E_{cp}/I_o$ but possibly large frequency errors, and a more narrow loop bandwidth may be used for the second and subsequent stages to acquire pilots expected to have weak $E_{cp}/I_o$ but small frequency errors.

For clarity, the inventive techniques have been described for the acquisition of pilots. In general, these techniques may be used to acquire any type of signal. To achieve this, the processing by the searcher and finger processor would be complementary to that performed at the transmission source for the signal to be acquired. The inventive techniques may also be used for pilots that are gated, in which case the searcher and finger processors are appropriately timed such that the processing is performed on the pilot portions.

Also for clarity, various aspects and embodiments of the invention have been described for the forward link in IS-95 and cdma2000. The acquisition techniques described herein may also be adapted for use on the reverse link. In IS-95 and cdma2000, each terminal is assigned a scrambling code used to distinguish that terminal. The scrambling code is combined (or multiplied) with the PN sequence to generate a spreading sequence that is used to spread the data prior to transmission to the base station. The acquisition of the signals from the transmitting terminals may be achieved by searching over a particular code space for each terminal to find detected peaks, which may then be re-evaluated. Pull-in may thereafter be performed on a number of candidate peaks to acquire the frequency of the peaks.

The techniques described herein may also be adapted for use in other CDMA systems, such as W-CDMA systems. Some of the processing in W-CDMA is different from that for IS-95 and cdma2000. For example, "covering" with a Walsh code in IS-95 and cdma2000 is equivalent to "spreading" with an orthogonal variable spreading factor (OVSF) code in W-CDMA, and "spreading" with the PN sequence in IS-95 and cdma2000 is equivalent to "scrambling" with a scrambling sequence in W-CDMA. The techniques described herein may be adapted to account for the difference in signal processing. For example, the code space to be searched may be determined based on the scrambling sequence used in W-CDMA (instead of the PN sequence).

The pilot acquisition techniques described herein may be implemented by various means. For example, these techniques may be implemented in hardware, software, or a combination thereof. For a hardware implementation, the elements used for pilot acquisition (e.g., the searcher and finger processor) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used for pilot acquisition may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as it known in the art.

The elements used to implement the pilot acquisition techniques described herein may be incorporated in a receiver unit or a demodulator that may further be incorporated in a terminal (e.g., a handset, a handheld unit, a stand-alone unit, and so on), a base station, or some other communication devices or units. The receiver unit or demodulator may be implemented with one or more integrated circuits.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of acquiring one or more pilots in a wireless communication system, comprising:
    searching for peaks in a received signal over a designated code space to provide a set of one or more candidate peaks;
    processing each candidate peak to acquire the candidate peak;
    performing the searching and processing a plurality of times such that the searching for a next set of candidate peaks is performed in parallel with the processing for a current set of candidate peaks; and
    terminating the searching and processing early upon detection of pilot acquisition to reduce acquisition time,
    wherein the searching includes
    detecting peaks over the designated code space to provide a set of detected peaks, and
    re-evaluating each detected peak to remove noise peaks and provide the one or more candidate peaks.

2. The method of claim 1, further comprising:
    pipelining the searching and processing for different sets of candidate peaks to shorten acquisition time.

3. The method of claim 1, wherein the designated code space includes phase for all or a portion of a pseudo-random noise (PN) sequence used to generate a pilot.

4. The method of claim 3, wherein the designated code space is partitioned into a plurality of code segments, and wherein the searching is performed over each code segment.

5. The method of claim 1, wherein the searching is performed by a searcher and the processing is performed by one or more finger processors.

6. The method of claim 5, wherein the processing for each candidate peak in the current set is performed by a respective finger processor and the processing for all candidate peaks in the current set is performed in parallel.

7. The method of claim 1, wherein the searching is performed using a plurality of sets of parameter values for the plurality of times.

8. The method of claim 7, wherein each set of parameter values includes a first value representing a number of chips for coherent accumulation of despread samples and a second value representing a number of chips for non-coherent accumulation of pilot symbols.

9. The method of claim 7, wherein the sets of parameter values having improved pilot detection performance for more likely operating conditions are used first.

10. The method of claim 1, wherein the communication system is a CDMA system.

11. The method of claim 10, wherein the CDMA system conforms to IS-95 or cdma2000 standard.

12. The method of claim 10, wherein the CDMA system conforms to W-CDMA or TS-CDMA standard.

13. A method of acquiring one or more pilots in a CDMA communication system, comprising:
    partitioning a range of possible frequency errors for the pilots into a plurality of frequency bins;
    evaluating each of the frequency bins to acquire the one or more pilots, wherein the evaluating includes:
    frequency translating data samples derived from a received signal to an approximate center of the frequency bin,
    searching for peaks in the received signal, based on the frequency-translated data samples, over a designated code space to provide a set of one or more candidate peaks,
    processing each candidate peak to acquire the candidate peak; and
    terminating the evaluating upon detection of pilot acquisition, and
    pipelining the searching and processing for different frequency bins such that the searching for a next frequency bin is performed in parallel with the processing for a current frequency bin.

14. An article of manufacture comprising:
    a computer usable medium having computer readable program code means embodied therein for acquiring one or more pilots in a wireless communication system, the computer readable program code means in said article of manufacture comprising
    computer readable program code means for searching for peaks in a received signal over a designated code space to provide a set of one or more detected peaks;
    computer readable program code means for re-evaluating each detected peak to remove noise peaks and provide a set of one or more candidate peaks;
    computer readable program code means for processing each candidate peak to acquire the candidate peak;
    computer readable program code means for performing the searching, re-evaluating and processing a plurality of times such that the searching for a next set of candidate peaks is performed in parallel with the processing for a current set of candidate peaks; and
    computer readable program code means for terminating the searching and processing early upon detection of pilot acquisition to reduce acquisition time.

15. A program storage device readable by a machine, tangibly embodying a program of instructions executable by the machine to perform a method for acquiring one or more pilots in a wireless communication system, said method comprising:
    searching for peaks in a received signal over a designated code space to provide a set of one or more detected peaks,
    re-evaluating each detected peak to remove noise peaks and provide a set of one or more candidate peaks;
    processing each candidate peak to acquire the candidate peak; and
    performing the searching, re-evaluating and processing a plurality of times such that the searching for a next set of candidate peaks is performed in parallel with the processing for a current set of candidate peaks; and
    terminating the searching and processing early upon detection of pilot acquisition to reduce acquisition time.

16. A device for acquiring one or more pilots in a wireless communication system, comprising:
    means for searching for peaks in a received signal over a designated code space to provide a set of one or more candidate peaks;
    means for processing each candidate peak to acquire the candidate peak;
    means for performing the searching and processing a plurality of times such that the searching for a next set of candidate peaks is performed in parallel with the processing for a current set of candidate peaks; and
    means for terminating the searching and processing early upon detection of pilot acquisition to reduce acquisition time,
    wherein the means for searching comprises
    means for detecting peaks over the designated code space to provide a set of detected peaks, and means for re-evaluating each detected peak to remove noise peaks and provides one or more candidate peaks.

17. The device of claim 16, further comprising:

means for pipelining the searching and processing for different sets of candidate peaks to shorten acquisition time.

18. The device of claim 16, wherein the means for searching further comprises means for partitioning the designated code space into a plurality of code segments and means for searching each of the plurality of code segments.

19. A device for acquiring one or more pilots in a wireless communication system, comprising:

a searcher configured to search for peaks in a received signal over a designated code space to provide a set of one or more detected peaks and to re-evaluate and detected peak to remove noise peaks and provide one or more candidate peaks;

one or more finger processors configured to process each candidate peak and to acquire the candidate peak; and a controller configured to control the searcher and the one or more finger processors means to search and process a plurality of times such that the searching for a next set of candidate peaks is performed in parallel with the processing for a current set of candidate peaks and to terminate the searching and processing early upon detection of pilot acquisition to reduce acquisition time.

* * * * *